United States Patent
Crane

(10) Patent No.: US 6,365,044 B1
(45) Date of Patent: Apr. 2, 2002

(54) BUOYANT MEDIA FILTER WITH DIFFUSER

(76) Inventor: Gregory L. Crane, 203 Walthall Ave., Marietta, GA (US) 30060

( * ) Notice: Subject to any disclaimer, the term of this patent is extended or adjusted under 35 U.S.C. 154(b) by 0 days.

(21) Appl. No.: 09/573,587

(22) Filed: May 18, 2000

Related U.S. Application Data

(60) Provisional application No. 60/135,369, filed on May 21, 1999.

(51) Int. Cl.⁷ .......................... B01D 24/00; B01D 35/30
(52) U.S. Cl. .................. 210/248; 210/169; 210/279; 210/456; 210/533
(58) Field of Search ................... 210/279, 456, 210/150, 151, 248, 533

(56) References Cited

U.S. PATENT DOCUMENTS

| | | | | |
|---|---|---|---|---|
| 2,973,097 A | * | 2/1961 | Snider | 210/279 |
| 3,317,044 A | * | 5/1967 | Marks | 210/279 |
| 3,451,554 A | * | 6/1969 | Wade | 210/279 |
| 4,228,013 A | * | 10/1980 | Degenkolb et al. | 210/279 |

* cited by examiner

*Primary Examiner*—Robert J. Popovics
(74) *Attorney, Agent, or Firm*—Womble Carlyle Sandridge & Rice

(57) ABSTRACT

A water filtration system has a tank partially filled with a floating bead filtration media. A cylindrical diffuser is disposed in the tank and extends from the upper portion to the lower portion thereof. The diffuser in internally partitioned into a lower chamber and an upper chamber and each chamber has slots that communicate with the tank. An supply conduit delivers soiled water from a pond to the lower chamber of the diffuser. The soiled water flows through the openings in the lower chamber and into the tank, upwardly through the filtration media where it is filtered, and into the upper chamber through the openings formed therein. An return conduit delivers filtered water from the upper chamber of the diffuser back to the pond.

15 Claims, 5 Drawing Sheets

BUOYANT MEDIA FILTER WITH DIFFUSER

REFERENCE TO RELATED APPLICATION

This application claims the benefit of the filing date of U.S. provisional patent application Ser. No. 60/135,369 filed May 21, 1999.

BACKGROUND OF THE INVENTION

1. Technical Field

The present invention relates generally to water filtration and more specifically to systems and methods of filtering water from decorative ponds and fountains.

2. Discussion of the Related Art

Decorative ponds and fountains have long been popular as part of the landscape of private homes, commercial buildings, public gardens, and parks. Many times, such decorative ponds support an array of aquatic plants and also a variety of wildlife such as fish, frogs, foul, and the like. For example, many modern decorative ponds are stocked with Koi, a rare and beautiful fish with oriental origins. The water in decorative ponds, and especially ponds that support wildlife, must be cleaned and filtered continuously in order to remove solid contaminants such as animal waste and also to prevent the buildup of ammonia, nitrite, and other chemicals that can be harmful to fish and plants.

Filtration systems for cleaning the water from decorative ponds have been available for many years. Early filtration systems generally included a tank at least partially filled with sand. In such systems, known as "sand filters," pond water is circulated with a pump through the tank and thus through the sand bed therein and back to the pond. As the water passes through the sand, it is filtered and cleaned and certain chemicals are removed from the water by bacteria that tend to develop and thrive in the sand bed.

While sand filters have been used successfully for many years to filter ponds as well as swimming pools and other bodies of water, they nevertheless have numerous inherent problems and shortcomings. One problem is that sand filter tanks must be relatively large in order to hold a sufficient amount of sand to filter a given volume of water. Further, since sand is more dense than water, the sand bed naturally rests on the bottom of the tank. Unfortunately, solid waste filtered from the water also tends to sink and thus progressively collects in and clogs the sand of the bed. Backwashing, which involves circulating water through the filter in a reverse direction, can dislodge and wash out some of the clogging material. However, since this material must be pumped upwardly out of the sand bed against the force of gravity to remove it from the tank, a substantial amount of material can be left behind. Further, the irregular surfaces of the millions of grains of sand in the sand bed tend to hold the waste material and form clumps of waste and sand, which tend not to be dislodged and washed away during backwashing. As a result, sand filters tend to become clogged frequently, which requires expensive, time consuming, and messy disassembly and manual cleaning. For these and other reasons, sand filters have been used less and less over the years.

More recently, sand filters have been replaced by a filtration system known as a "bead filtration system." A bead filtration system generally comprises a tank filled not with sand but with a filter media formed by millions of small generally spherical plastic beads. The beads are positively buoyant and thus, unlike sand beds, the filter media floats in the top of the tank when the tank is filled with water. Generally, pond water is circulated from the bottom portion of the tank, through the filter bed formed by the floating bead filtration media, and out the top portion of the tank back to the pond. Just as with sand filters, as the water passes through the filtration media, small solid contaminants become trapped in the media and beneficial bacteria living on the surfaces of the small beads consume and neutralize harmful chemicals in the water.

The advent of floating bead filtration systems successfully addressed some of the problems with traditional sand filters. For example, larger or heavier pieces of solid waste that would clog a sand bed tend to sink directly to the bottom of the tank and away from the filtration media in a floating bead system. Furthermore, backwashing a floating bead filtration system to clean the filter media generally is significantly more effective than backwashing a sand filter. This is because, among other things, solid waste that is dislodged from the floating bead media during backwashing naturally tends to sink downwardly away from the media, where it can be removed easily form the tank with the backwash water. Further, since the surfaces of the beads are not irregular like the surfaces of grains of sand, the solid waste collected in the media during the filter cycle is more easily dislodged during backwashing and does not tend to form resistant clumps. The tendency of the plastic beads to expand very slightly when released from their compacted state during backwashing also tends to release microscopic debris trapped within surface pores of the beads. Floating bead filter media for use in water filtration systems is commercially available from various sources such as the New Jersy based Alvis Corporation.

One floating bead filtration system includes an hourglass-shaped tank with the upper portion of the tank being filled with floating bead filter media. Water is circulated from a pond, through the tank from the bottom to the top, and back to the pond in an "in line" fashion. As the water flows through the top portion of the tank, it is passes through the floating bead filter media, where it is filtered and cleaned before returning to the pond. In many cases bubbles of air can be injected into the bottom portion of the tank with the goal that the bubbles will float upwardly through the floating bead filter media, where, theoretically, they will agitate the filter media to dislodge trapped waste and debris.

While "hourglass" bend filter systems are an improvement over sand filters, they nevertheless have had their own set of disadvantages. For example, severe internal clogging is common unless the system is cleaned frequently because of the restricted area of the tank neck, particularly on smaller filters. In fact, daily cleaning to prevent clogging is not unusual for models less than one cubic foot in volume. Perhaps more significantly, hourglass filters provide no convenient access to the filter media. Thus, manual cleaning of the filter media in the event of a severe clog requires disassembly of the system, is wet and messy, and can take hours. Finally, because of their in line operation, hourglass-shaped bead filtration systems do not provide for a rinse cycle after backwashing to prevent dislodged debris from being circulated back to the pond, and can not easily be bypassed during pond medication. For the forgoing and other reasons, hourglass-shaped floating bead filtration systems have not been entirely satisfactory.

In another floating bead filtration system design, the hourglass-shaped tank is replaced with a conventional oval or egg-shaped tank to eliminate the troublesome restricted neck area. Floating bead filter media partially fills the tank and pond water is circulated through the tank from the bottom to the top. In order to enhance the effectiveness of the water flow within the filter, a labyrinth of inflow tubes are arrayed in the bottom of the tank and a similar labyrinth of outflow tubes are distributed throughout the filter media in the top of the tank. Although this design tends to clog less often than the original hourglass-shaped filters and results in a more effective pressure backwash, it has its own set of inherent problems. For instance, the large number of elbow joints in the labyrinth of inflow and outflow tubes forces the water to make many turns as it circulates into and out of the filter through the tubes. Each of the turns introduces flow resistance and can cause energy robbing cavitation in the flow. The result is a substantial amount of overall resistance to the flow of water through the filter and a consequent requirement for larger and more expensive pumps. Further, the outflow tubes of these systems generally penetrate significantly downwardly into the filter media, which allows much of the water to return to the pond after passing through only a portion of the media. This can lead to clogging of the filter media above the median penetration of the outflow tubes and the creation of anaerobic or stagnant areas in the media. Finally, the labyrinth of inflow and outflow tubes within the tank can restrict the movement of filter media and debris during the backwash cycle, thus reducing the effectiveness of backwashing to clean the filter media.

Thus, a need exists for an efficient and effective floating bead water filtration system that successfully addresses the problems and shortcomings of the prior art. Such a system should be inherently clog resistant and should present very little if any inherent resistance to the flow of water through the system. The system should be designed to force all of the water to pass through substantially all of the filter media for complete cleaning and the prevention of stagnant regions and the formation of channels in the filter media. The system should be easy and non-messy to clean without getting wet and should have no internal structures to restrict the movement and agitation of filter media and debris during the backwash cycle. The system should provide for rinsing after backwash to eliminate delivery of dislodged debris back to the pond after backwashing and should provide for bypassing the filtration system to accommodate pond medication procedures. It is to the provision of such a filtration system and to a method of filtration practiced thereby that the present invention is primarily directed.

SUMMARY OF THE INVENTION

Briefly described, the present invention, in a preferred embodiment thereof, comprises an improved floating bead water filtration system for filtering and cleaning water from decorative ponds, and particularly ponds that support a population of fish or other wildlife. The filtration system includes a traditional generally oval-shaped tank having an upper portion and a lower portion. Floating bead filtration media is disposed in and at least partially fills the tank. The filtration media floats to and forms a filtration bed in the upper portion of the tank when the tank is filled with water. Preferably, the filtration media fills approximately the upper half of the tank.

A generally tubular water diffuser is disposed in the tank and extends axially from the upper portion of the tank to a position in the lower portion of the tank below the filtration bed. The diffuser is capped at its bottom and top ends and is internally partitioned by a baffle into an upper or return chamber and a lower or supply chamber. An array of supply slots are formed in the wall of the diffuser adjacent its bottom and communicate between the supply chamber of the diffuser and the lower portion of the tank below the filtration bed. Similarly, an array of return slots are formed in the wall of the diffuser adjacent its top and communicate between the return chamber of the diffuser and upper portion of the tank. The second array of slots are positioned such that they reside within the filtration bed near its uppermost extent when the system is in operation.

A supply conduit communicates with the supply chamber of the diffuser for delivering soiled water from a pond thereto. A return conduit communicates with the return chamber of the diffuser for delivering filtered water from the upper chamber back to the pond. In operation, soiled water from a pond is pumped through the supply conduit to the supply chamber of the diffuser. The soiled water then passes through the array of supply slots and enters the lower portion of the tank, from where it flows upwardly through the bed of floating bead filter media, which cleans and filters the water in the traditional way. The filtered water then enters the return chamber of the diffuser through the array of return slots and is delivered through the return conduit back to the pond. Thus, as water circulates through the filtration system, it is continuously filtered and cleaned.

In one embodiment, a multi-port control valve is mounted to the top of the diffuser and is exposed atop the tank. A central return port of the valve is coupled directly to and communicates with the return chamber of the diffuser. The peripherally located supply ports of the valve are coupled to the supply chamber of the diffuser through a set of transfer tubes that extend through the return chamber of the diffuser and through the central baffle into the supply chamber. During the filter cycle, soiled water from a pond is directed through the supply ports of the control valve and travels into the supply chamber through the transfer tubes. From the supply chamber, the water passes into the tank, flows up through the filter media where it is filtered, and enters the return chamber from where it is directed back to the pond through the return port of the valve. During a backwash cycle, the water flow is reversed so that the filter media is agitated and stirred about by the reverse flowing water to release debris and contaminants trapped in the filter media during the filter cycle.

Because of the evenly and symmetrically distributed return slots in the diffuser, the backwash process is particularly effective at cleaning the media and dislodging debris and clumps of debris that may be trapped therein. Further, the combined cross-sectional area of the transfer tubes and the mean free area of the slots in the diffuser are predetermined to be larger than the cross-sectional area of the plumbing pipes supplying water from the pond. Thus, in either cycle, the filtration system of this invention introduces little or no addition resistance to the flow of water beyond that already encountered in the supply plumbing. High flow rates can thus be maintained with relatively little water pressure.

Thus, a water filtration system that successfully addresses the problems and shortcomings of the prior art is now provided. The system eliminates restricted or narrow necks that have caused clogs in some prior art systems and contains no internal plumbing elbows that force the water to turn corners and that introduce resistance in the flow within the filter. Larger or heavier debris fall naturally to the bottom of the tank before encountering the filter media and smaller debris trapped by the filter media is easily dislodged and precipitates out of the filter media during the backwash cycle. The configuration of the central diffuser with supply and return chambers defined within a single central jacket insures even and symmetric flow of water upwardly through the filter media for maximum filtration and the elimination of channeling common with prior art systems. Finally, the location of the return slots in the uppermost extent of the bed of filter media insures that water traverses the maximum volume of filter media for complete and efficient cleaning before being delivered back to the pond. These and other features, objects, and advantages of the invention will become more apparent upon review of the detailed description set forth below when taken in conjunction with the accompanying drawing figures, which are briefly described ad follows.

DETAILED DESCRIPTION OF THE PREFERRED EMBODIMENTS

Figure 1:
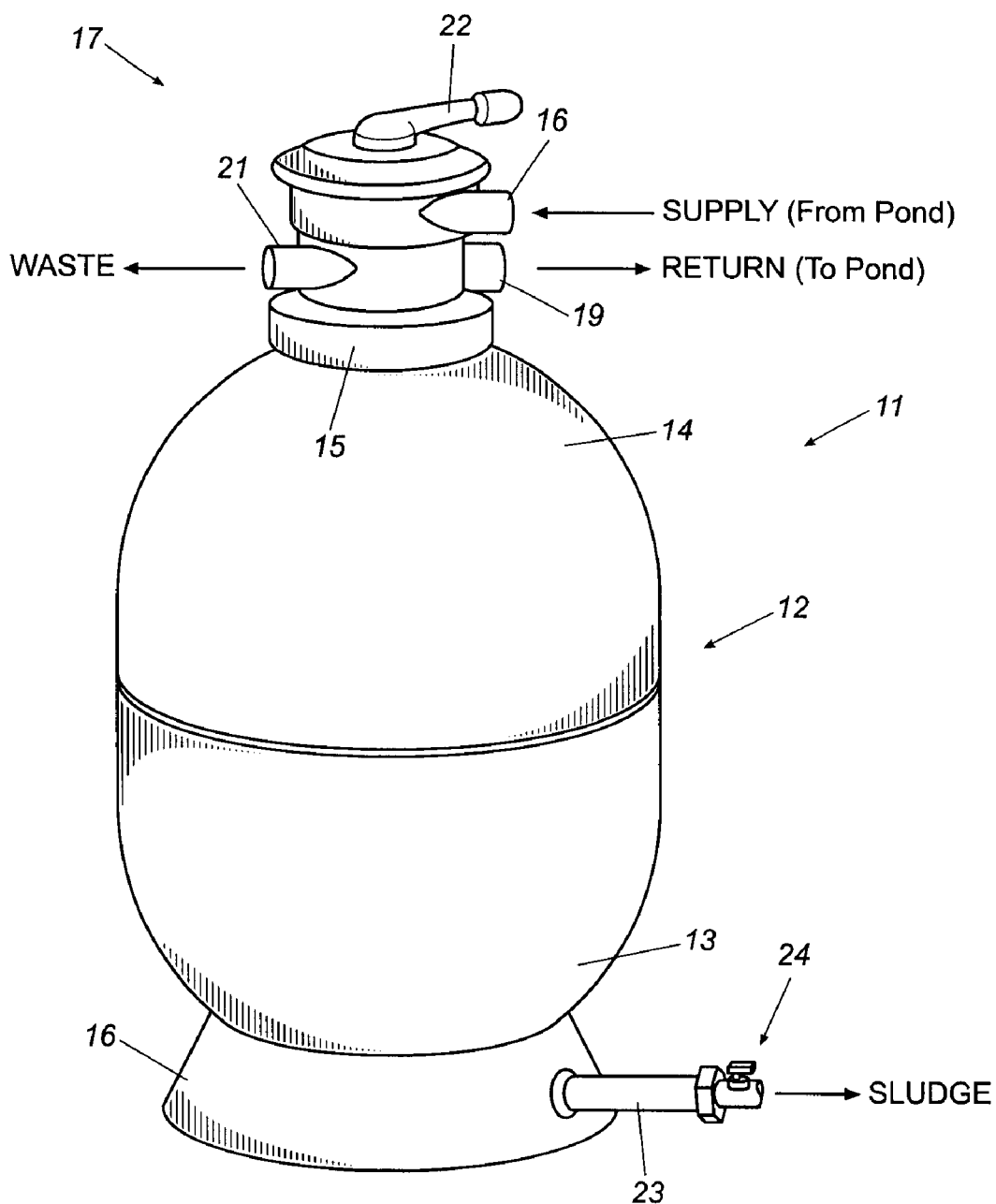
FIG. 1 is a perspective view of the outward appearance of a water filtration system that embodies principles of the invention in a preferred form.

Referring now in more detail to the drawings, in which like reference numerals refer to like elements throughout the several views, FIG. 1 illustrates the outward appearance of a water filtration system that embodies principles of the invention in a preferred form. The filtration system 11 includes a substantially oval or egg-shaped tank 12 having a lower portion 13 and an upper portion 14. The tank 12 is formed with an open mouth 15 at its top end and is supported in an upright position on the ground or other surface by a support base 16. A multi-port water flow control valve 17 projects upwardly from the mouth 15 of the tank 12. Multi-port control valves suitable for use with the present invention are commercially available from a variety of sources and need not be described in great detail here. In general, however, the valve 17 has a supply coupling 18, a return coupling 19, and a waste coupling 21. In use, these couplings are connected through an appropriate plumbing and pump system such that soiled water from a pond is pumped to the supply coupling 18 and filtered water is returned to the pond through the return coupling 19. Waste coupling 21 can direct water to a disposal location during certain cycles of the valve such as, for example, the backwash cycle, as described in more detail below.

Mode selection handle 22 can be appropriately positioned by a user to select a desired water flow through the valve and thus a desired mode of operation of the filtration system. Common selectable modes of operation include filter mode, backwash mode, rinse mode, recirculate mode, and bypass mode. It has been found that a multi-port control valve model SP714 T1 available from Hayward Pool Products, Inc. of Elizabeth, N.J. functions well with the present invention; however, other models and other brands of commercially available control valves may also be used and the present invention is not limited to any particular control valve. A sludge drain pipe 23 is coupled to the bottom of the tank 12 as detailed below and preferably includes a sludge valve 24 for selectively purging the tank 12 of sludge and debris that may collect in the bottom of the tank during use.

Figure 2:
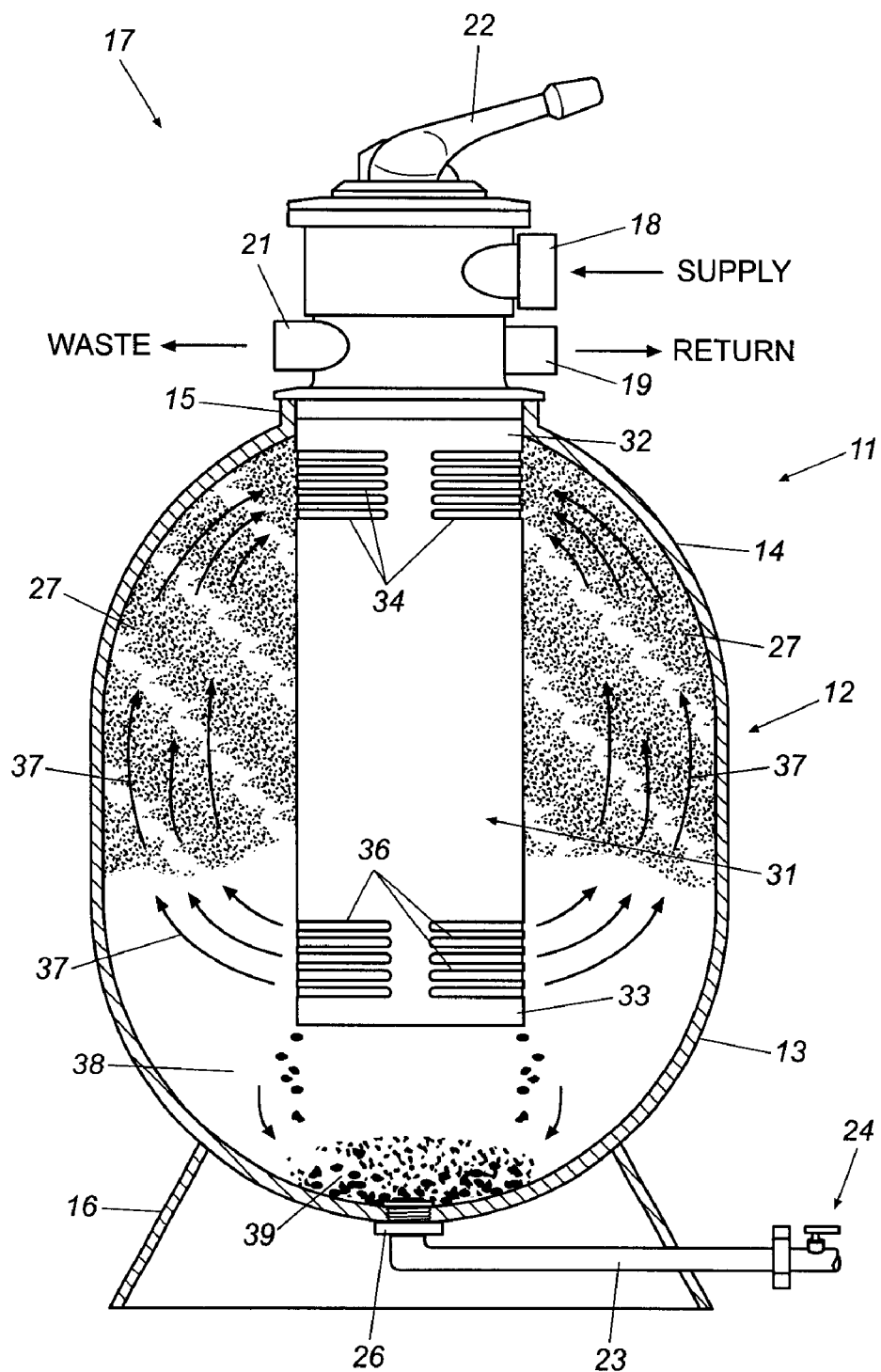
FIG. 2 is a front plan partially sectioned view of the water filtration system of FIG. 2 illustrating the diffuser and other internal components of the system.

FIG. 2 illustrates the filtration system 11 with the tank 12 shown in cross-section to reveal some internal components of the system. As in FIG. 1, the tank 12 has a lower portion 13, an upper portion 14, a mouth 15, and is supported in an upright position on base 16. Multi-port control valve 17 projects upwardly from the mouth 15 and includes supply, return, and waste couplings as described above and mode selection handle 22. The tank 12 is partially filled with floating bead filtration media 27. When the tank 12 is filled with water as it is during normal operation, the beads of the filtration media float to the upper portion 14 of the tank 12 where they compact somewhat together to form a filter bed within the top portion of the tank. The filter bed extends downwardly to a location intermediate the top and bottom of the tank and the space below the filter bed is substantially free of filter media.

Floating bead filter media is commercially available from a variety of sources such as, for example, the New Jersey based Alvis Corporation, and its operation need not be described in detail here. In general, however, the individual plastic beads of the media, which may be formed of polyethelene, usually are from about 0.015 to about 0.020 inches in diameter and are generally spherical in shape. The beads are designed with surfaces suitable for capturing and removing small and microscopic debris from water passing through the filter bed and for supporting colonies of beneficial bacteria such as Nitrosomonas and Nitrobacter, which neutralize certain harmful chemicals that tend to collect in pond water.

A central diffuser 31 is disposed in the tank 12 and extends axially from a top end 32 at the mouth 15 of the tank to a bottom end 33 located below the filter bed formed by the floating bead filter media 27. The control valve 17 is mounted to the top end 32 of the diffuser 31 for circulating water through the diffuser and through the filtration system as described in more detail below. An array of circumferentially extending supply slots 36 are formed in the bottom portion of the diffuser 31 below the filter bed and a similar array of return slots 34 are formed in the top portion of the diffuser 31. The return slots 34 are positioned in the uppermost region of the filter bed and each of the supply and return slots has a width less than the diameter of the beads of the filter media to prevent beads from entering the diffuser. In this regard, it has been found that for standard floating bead filter media, slots having a width of about 5/32 inches are just slightly smaller than the beads and function well to keep the beads out of the diffuser. It will be understood by those of skill in the art that configurations other than the illustrated circumferentially extending slots may also be used within the scope of the invention. For example, small holes or larger openings covered by a screen may be substituted with comparable results, although slots are considered by the inventor to be the best mode of carrying out the invention.

The filtration system of FIG. 2 is shown functioning in its normal filter mode with flow lines 37 indicating the flow of water through the system. A detailed discussion of the function of the system is provided below. Generally, however, soiled supply water from a pond, which may contain relatively larger contaminants such as fish waste, dirt, and clumps of material, as well as microscopic contaminants and harmful chemicals, is directed out of the supply slots 36 at the bottom end portion of the diffuser 31. Relatively larger and heavier contaminants 38 entrained in the water flow tend to fall under the influence of gravity to the bottom of the tank 12, where they collect as sludge 39. Sludge drain pipe 23 is coupled to and communicates with the bottom of the tank 12 through a sludge pipe coupling 26, and the sludge 39 can be drained from the bottom of the tank periodically by opening sludge valve 24. Remaining soiled water moves upwardly as indicted by flow arrows 37 into and through the filter bed formed by the filter media 27, where it is filtered, cleaned, and scrubbed of harmful chemicals in the usual way. At the top of the filter bed, the filtered water flows back into the diffuser 31 through return slots 34, from where it is directed by the control valve through the return coupling 19 and back to the pond. Thus, soiled water continuously circulates through the filtration system and is continuously filtered and cleaned to maintain a clean and healthy pond.

Over time, the filter media becomes saturated with waste and debris from the pond water and has to be cleaned as a part of system maintenance for continued efficient operation. This cleaning is accomplished by manipulating the control lever 22 to select the backwash mode of system operation. In this mode, the flow of water is reversed so that it flows out the return slots 34 and into the supply slots 36, from where it is delivered not back to the pond but instead through the waste coupling to a discard location. The reversed flow of water within the tank agitates the floating beads of the filter media causing them to de-compact and swirl about randomly within the tank. The agitated motion of the beads dislodges debris trapped within the filter bed, larger debris or clumps of debris falling to the bottom of the tank and smaller debris becoming entrained in the flow and delivered therewith to the discard location. After a sufficient time, usually a few minutes, in this mode, the filter bed is cleaned, precipitated sludge can be drained, and the system can be switched back into its normal filter mode. Preferably, however, the system is first switched for a short time to a rinse mode, wherein the water circulates normally but is delivered to the discard location rather than the pond to prevent a backwash of dislodged debris into the pond. Thus, the system is easily maintained and the user remains clean and dry.

Figure 3:
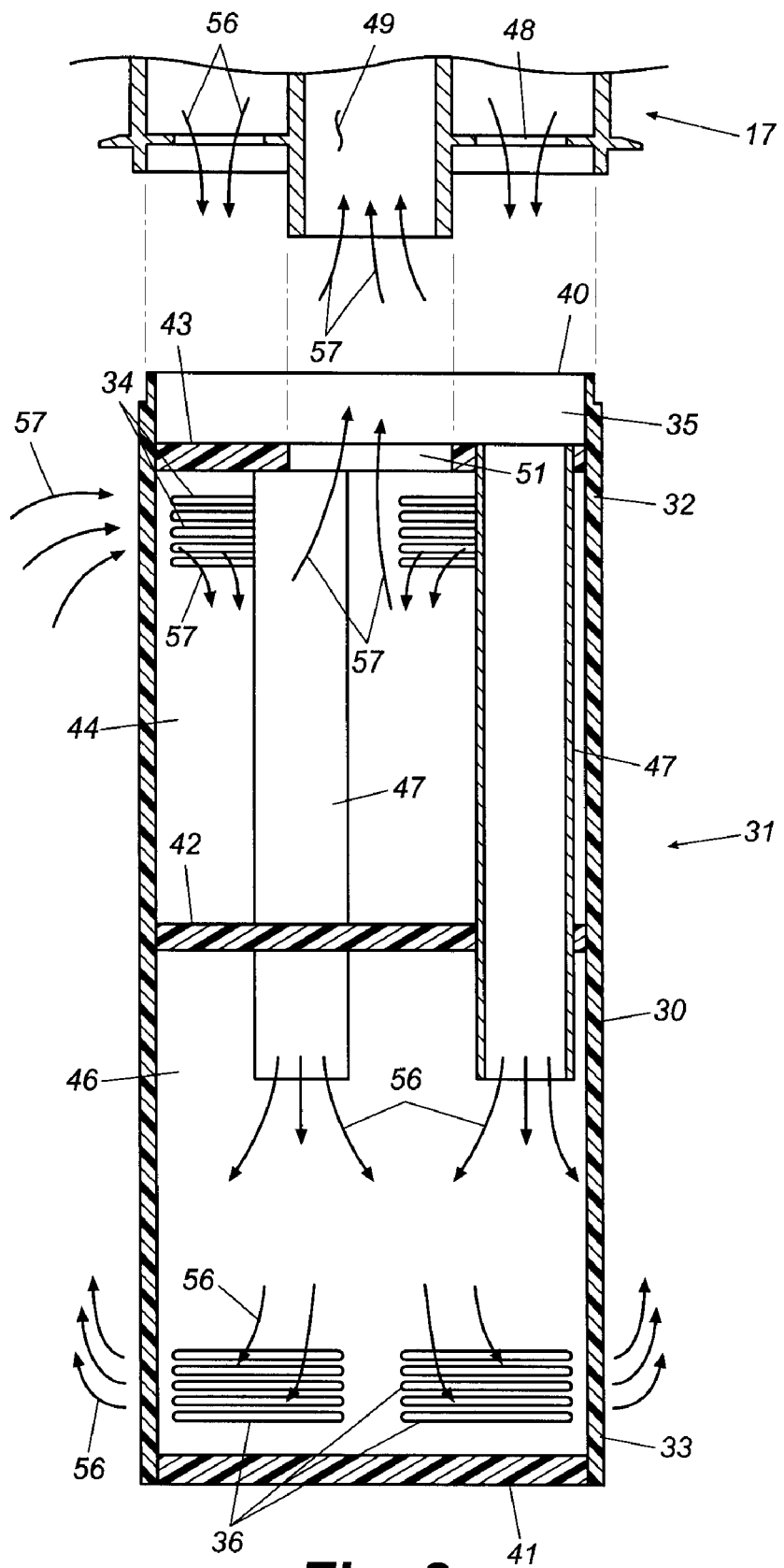
FIG. 3 is a cross-sectional view of one embodiment of a diffuser that embodies principles of the invention.

FIG. 3 is a cross-sectional view of the central diffuser 31 illustrating a preferred internal structure and components thereof. The diffuser 31 has a cylindrical outer jacket 30 with an upper end portion 32 and a lower end portion 33. A disc-shaped end cap 41 is secured within and closes of the bottom of the jacket and a ported distribution plate 43 is secured within the top end of the jacket a short distance from the top rim 40 thereof. A central baffle 42 is secured within the jacket intermediate its ends. The baffle 42 internally partitions the cylindrical jacket 30 into a lower supply chamber 46 and an upper return chamber 44. Supply slots 36 communicate between the supply chamber 46 and the lower interior portion of the tank and return slots 34 communicate between the return chamber 44 and the upper interior portion of the tank.

The distribution plate 43 is formed with a central opening 51 and an array of three peripheral openings 52 (FIG. 4) surrounding the central opening 51. The central baffle 42 has no central opening but is formed with an array of three peripheral openings 53 (FIG. 5) that have the same diameter as the peripheral openings 52 in the distribution plate and that are aligned longitudinally therewith. A set of three transfer tubes 47 are disposed within the diffuser. Each transfer tube 47 is disposed at its top end within a respective one of the peripheral openings 52 in the distribution plate 43 and extends downwardly through the aligned opening 53 in the central baffle 42 and into the supply chamber 46. Each transfer tube is sealed within it respective pair of openings 52 and 53 and thus communicates directly between the relatively narrow space above the distribution plate 43 and the supply chamber 46.

The base portion of the control valve 17 is shown in an exploded position for clarity in FIG. 3 but, in operation, is mounted to the top of the diffuser 31 as indicated by the vertical dashed lines. The control valve is internally formed with a central return port 49 flanked by one or more supply ports 48 as shown. When the control valve 17 is mounted to the top of the diffuser, the central return port 49 extends through and seals within the central opening 51 formed in the distribution plate 43. In this way, the central return port 49 of the control valve is in direct communication with the return chamber 44 of the diffuser. Further, with the control valve mounted to and closing off the top of the diffuser, the narrow space above the distribution plate 43 defines an annular plenum 35 disposed between the supply ports 48 of the valve 17 and the upper ends of the three transfer tubes 47. It will thus be seen that the supply ports 48 are in direct communication with the supply chamber 46 through the plenum 35 and the transfer tubes 47. Accordingly, with the control valve 17 mounted to the diffuser 31 as described, the supply chamber 46 and return chamber 44 are completely isolated from each other with the supply ports 48 of the control valve being in direct communication with the supply chamber 46 and with the return port 49 of the valve being in direct communication with the return chamber 44.

Arrows 56 in FIG. 3 indicate the flow of water through the diffuser 31 during a normal filter cycle of the filtration system 11 and further clarify and expand upon the general operational description provided above relative to FIG. 2. More specifically, with the control valve in its filter mode, soiled water pumped to the control valve from the pond is directed through the supply ports 48 and into the annular plenum 35. The soiled water then flows through the transfer tubes 47 and directly into the supply chamber 46 of the diffuser. In this regard, the diameter of the transfer tubes 47 is selected such that the combined cross-sectional area of the three transfer tubes exceeds the cross-sectional area of the plumbing delivering pond water to the system. For example, if the supply plumbing is formed of 1.5 inch PVC pipes with a corresponding cross-sectional area of about 1.8 square inches, which is typical, then transfer tubes formed of 1.25 inch diameter pipe for a total combined cross-sectional area of about 3.7 square inches might be selected. In this way, the flow resistance of the transfer tubes is less than that of the plumbing itself such that no additional resistance to the flow of water is introduced by the transfer tubes.

From the supply chamber 46, the soiled water flows through the array of supply slots 36 and into the lower portion of a tank in which the diffuser is disposed. As with the transfer tubes, the combined net free area of the supply slots 36 is greater than the cross sectional area of the supply plumbing and preferably greater than the combined cross sectional area of the transfer tubes 47 to insure that the slots do not introduce any additional flow resistance into the system. Within the tank and outside the diffuser, the soiled water flows upwardly through the floating bead filter media where it is cleaned and filtered. Near the top of the filter bed, the filtered water enters the return chamber 44 through the array of return slots 57, again configured to have a net free area greater than the cross-sectional area of the supply plumbing. From the return chamber 44, the filtered water is forced through the central opening 51 in the distribution plate 43 and into the return port 49 of the control valve 17, which directs the filtered water back to the pond.

In view of the forgoing description of the invention, it will be seen that the filtration system of the present invention provides numerous benefits and advantages over prior art systems. For instance, the water flow in the present invention is uniform and symmetrical within the tank, which insures that the water passes through the maximum volume of filter media and does not tend to "channel" as can be the case with many prior art systems. Further, since the return slots of the diffuser are located in the uppermost extent of the filter bed, the water is constrained to pass completely from the bottom of the filter bed to the top, further insuring that the maximum filter media is encountered by the water. Perhaps more significant is the fact that the filtration system of the present invention includes no energy robbing and flow restricting angled pipes through which the water must pass within the filter. This contrasts with prior art systems that may contain as many as 14 ninety degree elbows within the tank. This, in conjunction with the careful selection of the cross-sectional areas of transfer tubes, flow slots, and the like, results in a filtration system that introduces little or no additional flow resistance into the circuit. In fact, flow rates of 300 gallons per hour can easily be maintained with the present invention using a pump pressure of only 1 pound per square inch, which far exceeds the performance of prior art systems.

Backwashing the system to clean the filter media is very efficient and effective with the present invention. When placed in the backwash mode, the reversed flow of water into the filter media through the symmetrically arrayed circumferential return slots causes even and relatively violent agitation of the filter media, resulting in a thorough cleaning in short order. Any large debris that may have become lodged within the lower supply chamber of the diffuser is immediately sucked out through the transfer tubes during backwash and delivered to the disposal area. Sludge loosened from the filter media is simply drained through the sludge drain pipe. When backwashed regularly, the filtration system of this invention rarely requires manual cleaning. Even if manual cleaning is required after a long period of neglect or abuse, one simply removes the control valve and diffuser from the tank and agitates the filter media manually with an appropriate tool to loosen collected debris. The valve and diffuser are then replaced, the system backwashed and rinsed, and it is ready for operation.

Figure 4:
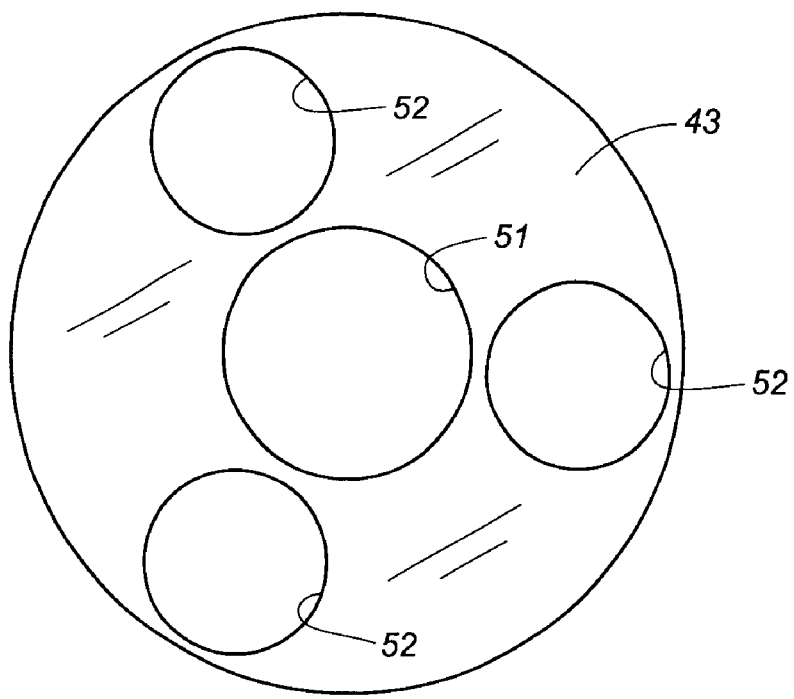
FIG. 4 is a top plan view of the upper baffle of the diffuser illustrated in FIG. 3
Figure 5:
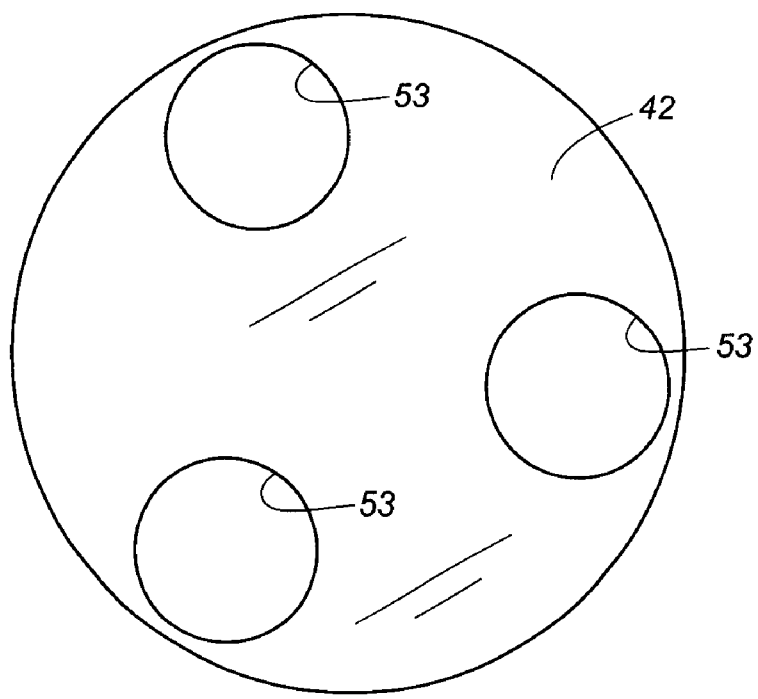
FIG. 5 is a top plan view of the central baffle of the diffuser illustrated in FIG. 3

FIG. 4 is a top plan view of a preferred embodiment of the distribution plate 43 of the diffuser 31. The distribution plate 43 has a central opening 51 sized to receive the return port 49 of the control valve and an array of equally spaced peripheral openings 52 for receiving the ends of the transfer tubes. FIG. 5 illustrates a corresponding preferred embodiment of the central baffle 42 of the diffuser. The baffle 42 is formed with an array of three equally spaced peripheral openings 53 that are positioned to align with the peripheral openings of the distribution plate and receive transfer tubes as described above. Preferably, the end cap, central baffle, distribution plate, transfer tubes, and outer jacket of the diffuser are made of PVC plastic. However, other materials such as other types of plastics or metals may be selected depending upon application specific requirements.

Figure 6:
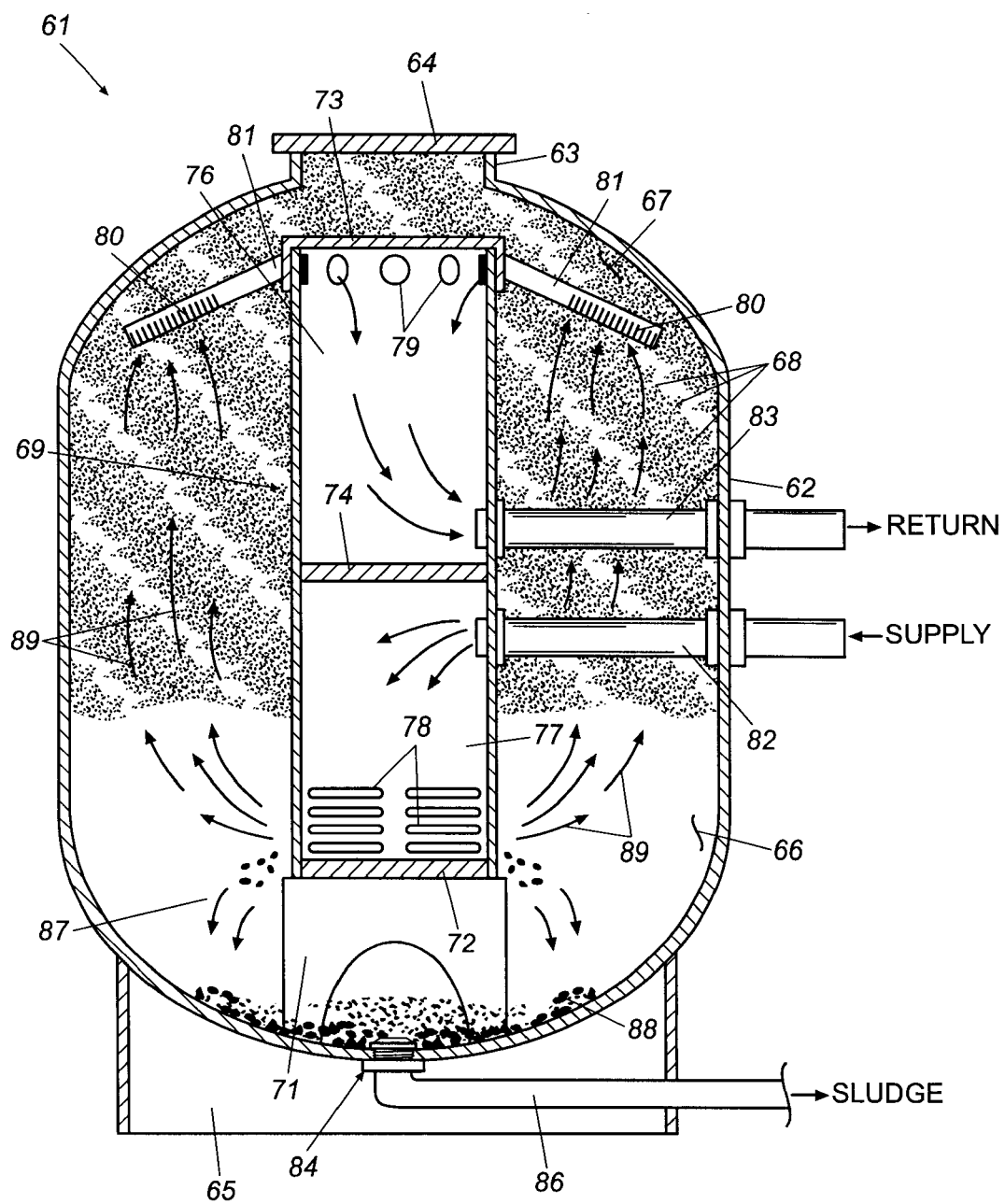
FIG. 6 is a cross-sectional view of a water filtration system that embodies principles of the invention in an alternate preferred form.

FIG. 6 illustrates a filtration system that embodies principles of the invention in an alternate form more suitable for use with larger tanks and systems with larger flow capacity. The filtration function in this embodiment is essentially the same as in the previous embodiment; however, the supply and return of water is somewhat different. The filtration system 61 includes a tank 62 having a mouth 63 closed by a hatch 64. The tank 62, which is supported on a base 65, has a lower portion 66 and an upper portion 67 and is partially filled with floating bead filter media 68, which resides in the upper portion of the tank when the tank is filled with water. A generally cylindrical diffuser 69 is centrally located within the tank 62 and extends from a location near the top of the tank to a position below the level of the filter media 68. The diffuser 69 rests, in the illustrated embodiment, on a support pedestal 71, which, in turn, is supported on the bottom of the tank 62. A sludge drain pipe 86 is connected with a sludge drain coupler 84 to the bottom of the tank for draining collected sludge from the tank periodically, as described above relative to the previous embodiment.

A bottom end cap 72 closes the bottom of the diffuser 69 and a top end cap 73 is mounted on and closes the top of the diffuser. A solid central baffle 74 is mounted and secured within the diffuser 69 and internally partitions the diffuser into an upper return chamber 76 and a lower supply chamber 77. Openings in the form of an array of supply slots 78 are formed near the bottom of the diffuser and communicate between the supply chamber of the diffuser and the lower portion 66 of the tank for delivering soiled pond water to the tank. An array of return openings 79 are formed around the top of the diffuser 69 for receiving filtered water after it has flowed through the bed of filter media 68. In the illustrated embodiment, a return tube or radial 81 communicates at one end with each of the return openings 79 and extends generally in a radial direction outwardly from the central diffuser 69 toward the wall of the tank 62. Each of the radials 81 is formed with an array of slots 80 that are sized to keep filter media beads from entering but to allow a sufficient flow of water into the radials and thence into the return chamber of the diffuser.

A supply conduit 82 communicates at one end with the supply chamber 77 of the diffuser 69 and extends through the wall of the tank 62 for receiving soiled water pumped from a pond. Similarly, a return conduit 83 communicates at one end with the return chamber of the diffuser and extends through the wall of the tank 62 for returning filtered water back to the pond. In this embodiment, an external control valve (not shown) may be integrated into the auxiliary plumbing for the filtration system to provide for backwashing, rinsing, bypassing, and other functions as described above.

The flow of water through the filtration system 61 during a normal filtration cycle is illustrated by flow arrows 89 in FIG. 6. Soiled pond water is pumped from the pond, through the supply conduit 82 and into the supply chamber 77 of the diffuser, where the water slows considerably due to the greater diameter of the diffuser. The soiled water passes from the supply chamber and into the bottom portion of the tank 62 through supply slots 78. As with the previous embodiment, the combined mean free area of the slots is greater than the cross sectional area of the supply and return plumbing of the system so that no addition flow restriction is introduced within the filtration system. As the soiled water passes into the tank, heavier debris 87 precipitates to the bottom of the tank and collects as sludge, which can be removed periodically through the sludge drain pipe 86. The remainder of the soiled water moves relatively slowly upwardly through the bed of floating bead filter media 68, where it is cleaned, filtered, and scrubbed. Near the uppermost extent of the filter bed, the filtered water enters the slots 80 formed in the radials 81 and is directed through the openings 79 into the return chamber 76 of the diffuser 69. In larger and higher volume systems, the use of radials on the return end of the diffuser, or on the supply end or both, is advantageous because they help to insure an even symmetrical flow of water through the filter media and help to prevent channeling through only the central volume of media surrounding the diffuser. From the return chamber 76, the filtered water flows out through the return conduit 83, from where it is delivered back to the pond in a continuous filtration cycle.

Power backwashing of the system of FIG. 6 to clean the filter media is also similar to backwashing the system of the previous embodiment. During backwashing, the flow of water is reversed so that jets of water are forced out of the radials and circulate downwardly. This agitates and swirls around the beads of the filter media, releasing trapped debris that falls to the bottom of the tank and is removed as sludge. Larger systems may also be supplied with forced air agitators if desired to enhance the agitation of the filter media for improved cleaning thereof.

The invention has been described herein in terms of preferred embodiments and methodologies. It will be understood by those of skill in the art, however, that many variations of the illustrated embodiments may be made within the scope of the invention. For instance, the preferred cylindrical shape of the diffuser may be replaced with a shape other than cylindrical. As mentioned above, radials may be added to the top or bottom or both ends of the diffuser if desired to enhance radial distribution of the water flow, although such radials are not preferred because they introduce some flow resistance into the system. The preferred arrangement, number, and configuration of the transfer tubes within the diffuser of the first embodiment may also be modified as long as water is delivered to the supply chamber of the diffuser. While the preferred diffuser has a single outer jacket internally partitioned into supply and return chambers, one may design an equivalent system wherein the two chambers are separate and distinct from each other and such a system is considered to be within the scope of the invention. Finally, one of the chambers, such as the supply chamber, may be eliminated altogether with transfer tubes simply terminating near the bottom of the tank. These and other additions, deletions, and modifications of the preferred embodiments illustrated and described herein may well be made by those of skill in the art without departing from the spirit and scope of the invention as set forth in the claims.

What is claimed is:

1. A water filtration system comprising:
    a tank having an upper portion and a lower portion;
    floating filtration media in said tank;
    a diffuser in said tank, said diffuser extending from said upper portion of said tank to said lower portion of said tank;
    said diffuser being internally partitioned into an upper chamber and a lower chamber;
    at least one opening formed in said lower chamber of said diffuser communicating with said lower portion of said tank;
    at least one opening formed in said upper chamber of said diffuser communicating with said upper portion of said tank;
    a water inlet communicating with said lower chamber of said diffuser for delivering soiled water to said lower chamber of said diffuser; and
    a water outlet communicating with said upper chamber of said diffuser for receiving filtered water from said upper chamber of said diffuser and directing it away from said filter system,
    whereby soiled water delivered to the lower chamber of the diffuser passes through the opening therein and enters the lower portion of the tank, flows through the floating filter media and is filtered thereby, enters the upper chamber of the diffuser through the opening therein, and is delivered from the upper chamber of the diffuser through the water outlet.

2. A water filtration system as claimed in claim 1 and wherein said diffuser is generally cylindrical.

3. A water filtration system as claimed in claim 1 and wherein said diffuser is internally partitioned by a baffle disposed in said diffuser.

4. A water filtration system as claimed in claim 1 and wherein said water inlet comprises a transfer tube in said diffuser.

5. A water filtration system as claimed in claim 4 and wherein said transfer tube extends through said upper portion of said tank, through said upper chamber of said diffuser, through said partition, and into said lower chamber of said diffuser.

6. A water filtration system as claimed in claim 1 and wherein said water inlet extends through a side of said tank and into said lower chamber of said diffuser.

7. A water filtration system as claimed in claim 1 and wherein said water outlet comprises a return port.

8. A water filtration system as claimed in claim 7 and wherein said return port extends through said upper portion of said tank and into said upper chamber of said diffuser.

9. A water filtration system as claimed in claim 7 and wherein said return port extends through a side of said tank and into said upper chamber of said diffuser.

10. A water filtration system as claimed in claim 1 and further comprising a sludge valve in said bottom portion of said tank for selectively expelling collected sediment from said tank.

11. A water filtration system as claimed in claim 1 and wherein said at least one opening in said lower chamber of said diffuser comprises an array of slots formed in said diffuser.

12. A water filtration system as claimed in claim 1 and wherein said at least one opening in said upper chamber of said diffuser comprises an array of slots formed in said diffuser.

13. A water filtration system as claimed in claim 1 and further comprising at least one radial having openings formed therein, said radial communicating with said at least one opening in said upper chamber of said diffuser and extending outwardly into said upper portion of said tank.

14. A water filtration system as claimed in claim 13 and wherein said at least one opening in said upper chamber of said diffuser comprises an array of openings and wherein said at least one radial comprises an array of radials communicating with and extending outwardly from said array of openings.

15. A water filtration system as claimed in claim 14 and wherein said radials extend outwardly from said diffuser in a generally radial pattern.

* * * * *